(12) United States Patent
Zhuang et al.

(10) Patent No.: US 12,256,332 B2
(45) Date of Patent: Mar. 18, 2025

(54) METHOD, APPARATUS, AND DEVICE FOR REDUCING TERMINAL POWER CONSUMPTION

(71) Applicant: Huawei Technologies Co., Ltd., Shenzhen (CN)

(72) Inventors: Hongcheng Zhuang, Shenzhen (CN); Ping Fang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 358 days.

(21) Appl. No.: 17/765,188

(22) PCT Filed: Sep. 22, 2020

(86) PCT No.: PCT/CN2020/116803
§ 371 (c)(1),
(2) Date: Mar. 30, 2022

(87) PCT Pub. No.: WO2021/063216
PCT Pub. Date: Apr. 8, 2021

(65) Prior Publication Data
US 2022/0394621 A1    Dec. 8, 2022

(30) Foreign Application Priority Data
Sep. 30, 2019   (CN) .......................... 201910948648.4

(51) Int. Cl.
*H04W 52/02*    (2009.01)
(52) U.S. Cl.
CPC ... *H04W 52/0235* (2013.01); *H04W 52/0212* (2013.01)

(58) Field of Classification Search
CPC ......... H04W 72/1268; H04W 74/0841; H04W 74/0866; H04W 84/06; H04W 74/0833;
(Continued)

(56) References Cited

U.S. PATENT DOCUMENTS

2014/0189409 A1\* 7/2014 Jeyaseelan .............. G06F 13/20
  713/324
2015/0071205 A1\* 3/2015 Morioka ........... H04W 52/0209
  370/329

(Continued)

FOREIGN PATENT DOCUMENTS

CN     107770850 A    3/2018
CN     107770851 A    3/2018
(Continued)

OTHER PUBLICATIONS

Qualcomm Incorporated, "UE Power Evaluation for DRX with Wake-Up Signaling," 3GPP TSG-RAN WG1 #87 , R1-1612068, Nov. 14-18, 2016, Reno, USA, 7 pages.
(Continued)

*Primary Examiner* — Nathan S Taylor
(74) *Attorney, Agent, or Firm* — Conley Rose, P.C.

(57) ABSTRACT

A method for reducing terminal power consumption includes sending, by a terminal device to an access device, power saving indication information indicating a power saving capability of the terminal device, and when the terminal device is idle, determining, by the access device, a sleep mode of the terminal device based on the power saving indication information and sending a sleep signal to the terminal device to indicate the terminal device to enter the sleep mode.

17 Claims, 7 Drawing Sheets

(58) Field of Classification Search
CPC ... H04W 72/12; H04W 74/08; H04W 52/146;
H04W 52/241; H04W 52/367; H04W
52/243; H04W 52/262; H04W 52/283;
H04W 52/34; H04W 52/346; H04W
52/38; H04W 52/40; H04W 88/10; H04W
52/14; H04W 52/24; H04W 52/36; H04W
52/26; H04W 52/28; H04W 52/42; H04W
52/0212; H04W 52/0229; H04W 52/0235;
H04W 76/27; H04W 8/24; H04W 52/02;
H04L 1/0003; H04L 1/0009; H04L 1/00;
H04L 41/344
See application file for complete search history.

(56) References Cited

U.S. PATENT DOCUMENTS

| | | | |
|---|---|---|---|
| 2016/0345380 A1* | 11/2016 | Diachina | H04W 4/70 |
| 2017/0332327 A1* | 11/2017 | Fang | H04L 5/0007 |
| 2018/0063789 A1* | 3/2018 | Chen | H04W 52/0229 |
| 2018/0255422 A1* | 9/2018 | Montemurro | H04W 52/0212 |
| 2019/0191371 A1* | 6/2019 | Alanen | H04W 52/0216 |
| 2019/0191375 A1 | 6/2019 | Cheng et al. | |
| 2019/0199923 A1* | 6/2019 | Nyström | G06F 1/3203 |
| 2019/0223105 A1* | 7/2019 | Wilhelmsson | H04W 52/0241 |
| 2019/0297575 A1* | 9/2019 | Seok | H04W 52/0229 |
| 2019/0313338 A1 | 10/2019 | Wilhelmsson et al. | |
| 2020/0154353 A1* | 5/2020 | Li | H04W 72/20 |
| 2020/0344684 A1* | 10/2020 | Rantala | H04W 52/02 |
| 2020/0344688 A1* | 10/2020 | Lv | H04J 3/0682 |
| 2020/0413341 A1 | 12/2020 | Xu et al. | |

FOREIGN PATENT DOCUMENTS

| | | | | |
|---|---|---|---|---|
| CN | 108235412 A | | 6/2018 | |
| CN | 110073696 A | | 7/2019 | |
| CN | 110167128 A | | 8/2019 | |
| CN | 110740498 A | | 1/2020 | |
| EP | 3255933 A1 | * | 12/2017 | ........ H04W 36/0072 |
| EP | 3493603 B1 | * | 2/2021 | ........... H04W 52/02 |
| EP | 4030833 A1 | | 7/2022 | |
| WO | 2018175760 A1 | | 9/2018 | |
| WO | 2018192746 A1 | | 10/2018 | |
| WO | WO-2019066863 A1 | * | 4/2019 | ........ H04W 52/0229 |
| WO | 2019136742 A1 | | 7/2019 | |

OTHER PUBLICATIONS

Qualcomm Incorporated, "Further discussion on Wake-up signal functions," 3GPP TSG RAN WG1 Meeting #92bis, R1-1804918, Sanya, China, Apr. 16-20, 2018, 7 pages.

Qualcomm Incorporated, "Further discussion on WUS configurations and procedures," 3GPP TSG RAN WG1 Meeting #92bis, R1-1804919, Sanya, China, Apr. 16-20, 2018, 8 pages.

InterDigital, Inc., "On UE power consumption characteristics," 3GPP TSG RAN WG1 Meeting #94bis, R1-1811225, Chengdu, China, Oct. 8-12, 2018, 2 pages.

InterDigital, Inc., "Discussion on Power Saving Techniques," 3GPP TSG RAN WG1 Meeting #95, R1-1813243, Spokane, USA, Nov. 12-16, 2018, 5 pages.

MediaTek Inc., "UE Behaviour of WUS Monitoring, 3GPP TSG-RAN WG2 Meeting #103," R2-1811177, Gothenburg, Sweden, Aug. 20-24, 2018, 5 pages.

Huawei, et al., "Gap determination in wake-up signal," 3GPP TSG-RAN WG2 Meeting #103, R2-1811817, Gothenburg, Sweden, Aug. 20-24, 2018, 7 pages.

Xiaomi Communications, "Discussion on how the WUS works with C-DRX," 3GPP TSG-RAN2# 106, R2-1906484, Reno, USA, May 13-17, 2019, 4 pages.

CATT, "UE Wakeup Mechanism and On-Demand Access for fNB-IoT UE Power Saving," 3GPP TSG RAN WG1 Meeting #89, Hangzhou, China, May 15-19, 2017, R1-1707456, 4 pages.

* cited by examiner

METHOD, APPARATUS, AND DEVICE FOR REDUCING TERMINAL POWER CONSUMPTION

CROSS-REFERENCE TO RELATED APPLICATIONS

This is a U.S. National Stage of International Patent Application No. PCT/CN2020/116803 filed on Sep. 22, 2020, which claims priority to Chinese Patent Application No. 201910948648.4 filed on Sep. 30, 2019. Both of the aforementioned applications are hereby incorporated by reference in their entireties.

TECHNICAL FIELD

The present invention relates to the field of terminal technologies, and in particular, to a method, an apparatus, and a device for reducing terminal power consumption.

BACKGROUND

In a current communications network, when user equipment (user equipment, UE), namely a terminal device, listens on a physical downlink control channel (physical uplink control channel, PDCCH) during communication with an access device, the user equipment detects no indication to the user equipment most of the time. In addition, listening on the PDCCH contributes to considerable power consumption of the UE. In a communications system, the UE is in an idle (idle) or inactive (inactive) state most of the time. However, in a conventional discontinuous reception (discontinuous reception, DRX) mode, the UE is periodically woken up to listen on the PDCCH but does not necessarily need to receive or send data, which causes unnecessary power consumption.

Currently, when the UE is in an idle state, a main radio of the UE may be disabled, and a wake-up signal (wake-up signal, WUS) or a sleep signal sent by the access device is monitored by using a wake-up radio (wake-up radio, WUR). The method can effectively reduce power consumption of the UE. However, hardware conditions of UEs are different, and the foregoing method is not applicable to UE that does not include a WUR.

SUMMARY

Embodiments of the present invention provide a method, an apparatus, and a device for reducing terminal power consumption, so that a sleep mode in use may be adaptively adjusted according to a power saving capability of a terminal.

According to a first aspect, an embodiment of the present invention provides a method for reducing terminal power consumption. The method includes: An access device receives power saving indication information sent by a terminal device, where the power saving indication information indicates a power saving capability of the terminal device; when the terminal device is idle, the access device determines a sleep mode of the terminal device based on the power saving indication information; and the access device further sends a sleep signal to the terminal device, where the sleep signal indicates the terminal device to enter the sleep mode.

The foregoing method provides an adaptive power saving mechanism. The terminal device may report the power saving capability of the terminal device to the access device, and further, the access device may select an appropriate sleep mode based on the power saving capability of the terminal device, to adaptively reduce power consumption of the terminal device.

With reference to the first aspect, in a possible implementation, the method further includes: The access device wakes up the terminal device based on the power saving indication information when the terminal device needs to be woken up.

With reference to the first aspect, in another possible implementation, the power saving indication information specifically indicates a WUS supported by the terminal device. An implementation in which the access device wakes up the terminal device based on the power saving indication information when the terminal device needs to be woken up may be:

When the power saving indication information indicates that the terminal device supports an out-of-band WUS, the access device sends an out-of-band WUS to a wake-up radio (WUR) of the terminal device, so that the WUR of the terminal device wakes up a main radio (MR) of the terminal device after receiving the out-of-band WUS; or when the power saving indication information indicates that the terminal device supports an in-band WUS but does not support an out-of-band WUS, the access device sends an in-band WUS to a main radio (MR) of the terminal device, so that the MR of the terminal device wakes up the main radio of the terminal device after receiving the in-band WUS.

With reference to the first aspect, in still another possible implementation, an implementation in which the access device determines the sleep mode of the terminal device based on the power saving indication information when the terminal device is idle may include:

The access device determines the sleep mode of the terminal device based on a service type of the terminal device and the power saving indication information when the terminal device is idle.

With reference to the first aspect, in yet another possible implementation, the sleep mode includes an out-of-band sleep mode and an in-band sleep mode. When the terminal device is in the in-band sleep mode, the main radio of the terminal device listens to a wake-up signal, or when the terminal device is in the out-of-band sleep mode, the main radio of the terminal device is disabled, and the WUR of the terminal device is enabled.

With reference to the first aspect, in still another possible implementation, an implementation in which the access device receives the power saving indication information sent by the terminal device may include:

The access device receives the power saving indication information sent by the terminal device through one of an RRC message, L1 signaling, uplink data piggybacking, or L2 signaling.

According to a second aspect, an embodiment of this application further provides a method for reducing terminal power consumption. The method includes: A terminal device determines power saving indication information based on a wake-up signal supported by the terminal device, where the power saving indication information indicates a power saving capability of the terminal device; and the terminal device further sends the power saving indication information to an access device, so that when the terminal device is idle, the access device determines a sleep mode of the terminal device based on the power saving indication information and sends a sleep signal to the terminal device; and therefore, after receiving the sleep signal, the terminal device controls, based on the sleep signal, the terminal device to enter the sleep mode.

With reference to the second aspect, in a possible implementation, the power saving indication information specifically indicates a WUS supported by the terminal device, and the method may further include:

A wake-up radio (WUR) of the terminal device receives an out-of-band WUS sent by the access device, where the out-of-band WUS is sent by the access device to the WUR of the terminal device when the power saving indication information indicates that the terminal device supports an out-of-band WUS; and the terminal device wakes up a main radio (MR) of the terminal device based on the out-of-band WUS.

With reference to the second aspect, in another possible implementation, the power saving indication information specifically indicates a WUS supported by the terminal device, and the method may further include:

A main radio (MR) of the terminal device receives an in-band WUS sent by the access device, where the in-band WUS is sent by the access device to the main radio (MR) of the terminal device when the power saving indication information indicates that the terminal device supports an in-band WUS but does not support an out-of-band WUS; and the terminal device wakes up the main radio (MR) of the terminal device based on the in-band WUS.

With reference to the first aspect, in still another possible implementation, the sleep mode is determined by the access device based on a service type of the terminal device and the power saving indication information when the terminal device is idle.

With reference to the first aspect, in yet another possible implementation, the sleep mode includes an out-of-band sleep mode and an in-band sleep mode. When the terminal device is in the in-band sleep mode, the main radio of the terminal device listens to a wake-up signal; or when the terminal device is in the out-of-band sleep mode, the main radio of the terminal device is disabled, and the WUR of the terminal device is enabled.

With respect to the first aspect, in still yet another possible implementation, the method may further include:

When detecting a change to the power saving capability of the terminal device, the terminal device sends power saving indication information updated after the change to the access device, where the power saving indication information updated after the change indicates a changed power saving capability of the terminal device.

With reference to the first aspect, in a further possible implementation, an implementation in which the terminal device sends the power saving indication information to the access device may include:

The terminal device sends the power saving indication information to the access device through one of an RRC message, L1 signaling, uplink data piggybacking, or L2 signaling.

According to a third aspect, an embodiment of this application further provides an apparatus for reducing terminal power consumption. The apparatus is applied to an access device and includes:

a receiving unit, configured to receive power saving indication information sent by a terminal device, where the power saving indication information indicates a power saving capability of the terminal device;

a determining unit, configured to: when the terminal device is idle, determine a sleep mode of the terminal device based on the power saving indication information; and a sending unit, configured to send a sleep signal to the terminal device, where the sleep signal indicates the terminal device to enter the sleep mode.

Optionally, the apparatus may further include another unit configured to implement the method for reducing terminal power consumption shown in any implementation of the first aspect. For details, refer to related descriptions in the first aspect. Details are not described herein again.

According to a fourth aspect, an embodiment of this application further provides an apparatus for reducing terminal power consumption. The apparatus is applied to a terminal device, and includes:

a determining unit, configured to determine power saving indication information based on a wake-up signal supported by the terminal device, where the power saving indication information indicates a power saving capability of the terminal device;

a sending unit, configured to send the power saving indication information to an access device, so that when the terminal device is idle, the access device determines a sleep mode of the terminal device based on the power saving indication information and sends a sleep signal to the terminal device; and a sleep unit, configured to: after the sleep signal is received, control, based on the sleep signal, the terminal device to enter the sleep mode.

Optionally, the apparatus may further include another unit configured to implement the method for reducing terminal power consumption shown in any implementation of the second aspect. For details, refer to related descriptions in the second aspect. Details are not described herein again.

According to a fifth aspect, an embodiment of this application further provides an access device, including one or more processors, one or more memories, and a transceiver. The transceiver is configured to exchange data with a terminal device, and the one or more memories are coupled to the one or more processors, and the one or more memories are configured to store computer program code, where the computer program code includes computer instructions, and when the one or more processors execute the computer instructions, the access device performs the method for reducing terminal power consumption according to any one of the first aspect or the implementations of the first aspect.

According to a sixth aspect, an embodiment of this application further provides a terminal device, including one or more processors, one or more memories, and a main radio. The main radio is configured to exchange data with an access device, and the one or more memories are coupled to the one or more processors, and the one or more memories are configured to store computer program code, where the computer program code includes computer instructions, and when the one or more processors execute the computer instructions, the terminal device performs the method for reducing terminal power consumption according to any one of the second aspect or the implementations of the second aspect.

According to a seventh aspect, an embodiment of this application further provides a computer readable storage medium. The computer readable storage medium stores computer executable instructions, and when the computer executable instructions are invoked by a computer, the computer is enabled to perform the method for reducing terminal power consumption according to any one of the second aspect or the implementations of the second aspect.

According to an eighth aspect, an embodiment of this application further provides a computer readable storage medium. The computer readable storage medium stores computer executable instructions, and when the computer executable instructions are invoked by a computer, the computer is enabled to perform the method for reducing terminal power consumption according to any one of the second aspect or the implementations of the second aspect.

BRIEF DESCRIPTION OF DRAWINGS

To describe the technical solutions in embodiments of the present invention more clearly, the following briefly describes the accompanying drawings for describing the embodiments. It is clear that the accompanying drawings in the following description show merely some embodiments of the present invention, and a person of ordinary skill in the art may still derive other drawings from these accompanying drawings without creative efforts.

DESCRIPTION OF EMBODIMENTS

Some key terms involved in embodiments of this application are first described as follows.

(1) Terminal device: A terminal device is also referred to as user equipment (user equipment, UE), is a device that provides data connectivity for a user, such as a handheld device having a wireless connection function, an in-vehicle device, a wearable device, a computing device, a mobile station (mobile station. MS) or another processing device connected to a wireless modem, and a mobile terminal communicating with one or more core networks via an access network. For another example, the terminal device may be a mobile phone, a tablet computer, a notebook computer, a personal digital assistant (personal digital assistant, PDA), a point of sales (point of sales, POS), an in-vehicle computer, or the like.

(2) Access device: An access device may be a base station (base station, BS), and is a device that provides a radio access service for the terminal device. The access device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a base band unit (base band unit, BBU), an access point (access point, AP), a wireless fidelity access point (wireless fidelity access point, Wi-Fi AP), a worldwide interoperability for microwave access (worldwide interoperability for microwave access, WiMAX) BS, and the like.

(3) Main radio (main radio, MR):

A main radio may be a main radio interface. The main radio in the terminal device is mainly configured to perform interactive communication with the access device. For example, the main radio obtains downlink data delivered by a core network device through the access device, receives a message with a complex structure sent by another network device, and sends data and various other messages to the access device.

(4) Wake-up receiver (wake-up receiver, WUR):

To implement sleep of a high-power main radio when the terminal device is idle, a low-power receiver, that is, a WUR, is disposed in the terminal device, and is configured to receive some simple signals. For example, when the WUR is in an active state, the WUR receives, within a period, a wake-up signal (wake-up signal, WUS) sent by the access device, to wake up the main interface of the terminal device.

Figure 1:
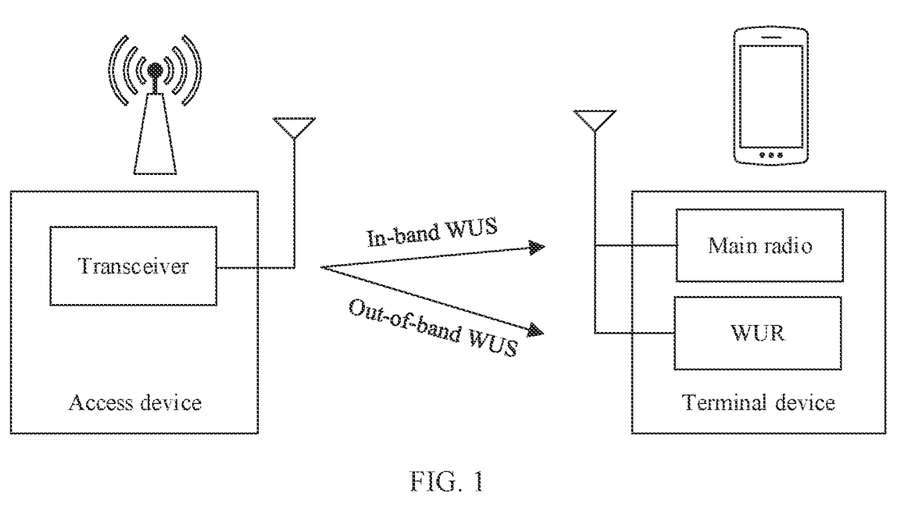
FIG. 1 is a schematic diagram of an in-band WUS and an out-of-band WUS according to an embodiment of this application.

(5) Wake-up signal (wake-up signal. WUS), in-band WUS, and in-band WUS:

In embodiments of this application, a wake-up signal is a signal that is sent by the access device to the terminal device, and a user wakes up the terminal device based on the wake-up signal. The wake-up signal may be classified into two types based on whether the terminal device is woken up by using the WUR: an in-band WUS and an out-of-band WUS. As shown in FIG. 1, the in-band WUS is a WUS sent by the main radio of the access device to the main radio of the terminal device, and the out-of-band WUS is a WUS sent by the main radio of the access device to the WUR of the terminal device.

It can be learned that the access device may send an out-of-band WUS to a terminal device only when the terminal device includes a WUR A terminal device that does not include a WUR can receive only an in-band WUS, that is, receive a WUS through a main radio.

(6) Power Saving Indication Information

Power saving capability indication information in embodiments of this application may also be referred to as a power saving capability IE (information element), and indicates a WUS signal supported by a terminal device that sends the power saving capability indication information. In other words, the indication information indicates a power saving capability of the terminal device that sends the power saving capability indication information.

(7) Sleep Mode

It should be understood that the terminal device includes a plurality of functional modules. To reduce power consumption of the terminal device, when the terminal device is idle, a sleep mode specifies modules/components in the terminal device work and modules/components do not work. In some scenarios, the sleep mode may be classified into a deep sleep (deep sleep) mode and a normal sleep mode. It should be understood that power consumption of a component in the deep sleep mode is lower than that of the component in the normal sleep mode, and power consumption of the component in the normal sleep mode is lower than that of the component in a no-sleep mode.

A power saving capability of a terminal device may correspond to a sleep mode. For example, a sleep mode of a terminal device including a WUR may be that a main radio enters the deep sleep mode (For example, the main radio is disabled, that is, a wireless fidelity modem (modem) is disabled, and a radio frequency (RF) module corresponding to the main radio is disabled), and the WUR is activated. For another example, a sleep mode of a terminal device that does not include a WUR may be that a main radio enters the normal sleep mode. For example, the main radio is not disabled, but the main radio does not listen on a PDCCH and listens to only an in-band WUS.

In a possible implementation of this application, a sleep mode may be classified into an in-band sleep mode and an out-of-band sleep mode based on the WUS signals. In the in-band sleep mode, that the main radio switches to the normal sleep mode may specifically be that the modem of the main radio does not listen on the PDCCH and listens to only a WUS. For another example, in the out-of-band WUS sleep mode, the main radio switches to the deep sleep mode (specifically, a circuit of the main radio may be disabled, so that no power consumption is generated) while the WUR works and listens to the WUS.

Figure 2:
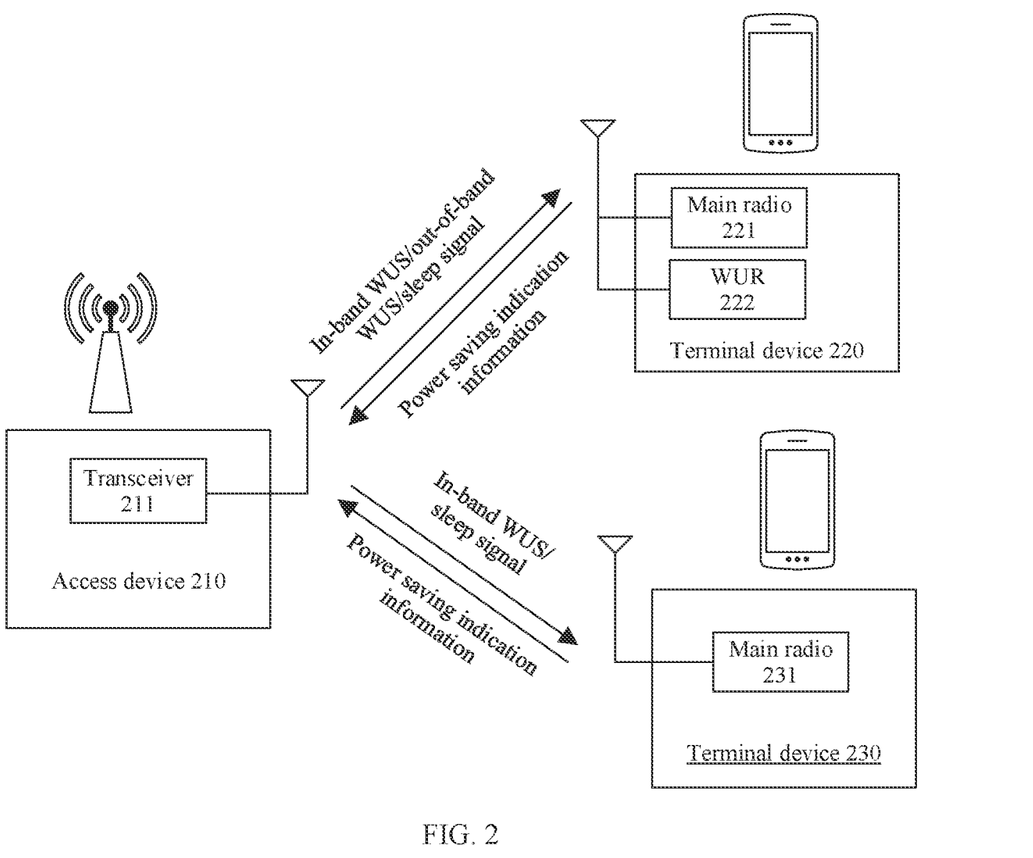
FIG. 2 is a schematic diagram of an architecture of a communications system according to an embodiment of this application.

FIG. 2 is a schematic diagram of an architecture of a communications system according to an embodiment of this application. The communications system 20 may include an access device 210 and at least one terminal device. The terminal device is also referred to as a user equipment (user equipment, UE). For example, the communications system 20 includes a terminal device 220 and a terminal device 230. The access device 210 may include a transceiver 211. The transceiver 211 is configured to exchange information with at least one terminal device 220 in the communications system. Power saving capabilities of the terminal devices may be the same or different. For example, the terminal device 220 includes a main radio 221 and a wake-up receiver (wake-up receiver, WUR) 222, and the terminal device 220 supports an in-band wake-up signal (wake-up signal, WUS) and an out-of-band WUS. The terminal device 230 includes a main transmitter 231 but does not include a WUR. The terminal supports an in-band WUS but does not support an out-of-band WUS. It should be understood that the terminal device 220 and the terminal device 230 are used as an example for description in FIG. 2. It should be understood that the communications system 20 may further include another terminal device, for example, a terminal device that has a main radio and a WUR and supports only an in-band WUS, a terminal device that includes a main radio and a WUR and does not support an out-of-band WUS or an in-band WUS, a terminal device that includes a main radio and a WUR and supports only an out-of-band WUS, a terminal device that includes a main radio but does not support an in-band WUS, or the like.

The terminal device may send power saving indication information to the access device, where the power saving indication information indicates a WUS supported by the terminal device.

In an implementation of this embodiment of this application, the access device 210 receives power saving indication information Q1 sent by the terminal device 220, where the power saving indication information Q1 indicates that the terminal device 220 supports an in-band WUS and an out-of-band WUS. When the terminal device 220 is in an idle state, the access device 210 may determine a sleep mode of the terminal device 220 based on the power saving indication information Q1, and send a sleep signal S1 to the terminal device 220, so that the terminal device 220 enters the sleep mode corresponding to the power saving indication information Q1 based on the received sleep signal S1. For example, the main radio 221 is disabled, and the WUR is activated. When identifying that the terminal device 220 needs to receive and transmit data, the access device 210 sends an out-of-band WUS to the WUR 222 of the terminal device 220 based on the power saving indication information, to wake up the main radio 221 of the terminal device 220.

In an implementation of this embodiment of this application, the access device 210 receives power saving indication information Q2 sent by the terminal device 230, where the power saving indication information Q1 indicates that the terminal device 230 supports an in-band WUS but does not support an out-of-band WUS. When the terminal device 230 is in an idle state, the access device 210 may send a sleep signal S2 to the terminal device 230 based on the power saving indication information Q2, so that the terminal device 230 may enter a sleep mode corresponding to the power saving indication information Q2 after receiving the sleep signal S2. For example, the main radio 221 enters a deep sleep mode and does not detect a PDCCH.

In an application scenario, the access device 210 may be a base transceiver station (Base Transceiver Station. BTS) in GSM or CDMA, may be a NodeB (NodeB) in WCDMA, may be an evolved NodeB (evolved NodeB, eNB or e-NodeB) in LTE, or may be a next generation NodeB (g-NodeB) in NR. The terminal device 220 and the terminal device 230 are electronic devices such as a mobile phone and a tablet computer.

In another application scenario, the transmit end device 210 is an access point in a WLAN. The terminal device 220 and the terminal device 230 are electronic devices such as a mobile phone and a tablet computer.

It should be understood that the technical solutions in embodiments of the present invention may be applied to various communications systems, for example, a global system for mobile communications (Global System of Mobile Communications. GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunications System, UNITS), an NR communications system, a worldwide interoperability for microwave access (Worldwide Interoperability for Microwave Access, WiMAX) communications system, and the like, which is not limited herein.

The following describes a method for reducing terminal power consumption in embodiments of this application.

Embodiments of this application provide an adaptive power saving mechanism. A terminal device may report a power saving capability of the terminal device, that is, a WUS supported by the terminal device, to an access device. Further, the access device may select an appropriate sleep mode based on the power saving capability of the terminal device, to adaptively reduce power consumption of the terminal device.

Figure 3A:
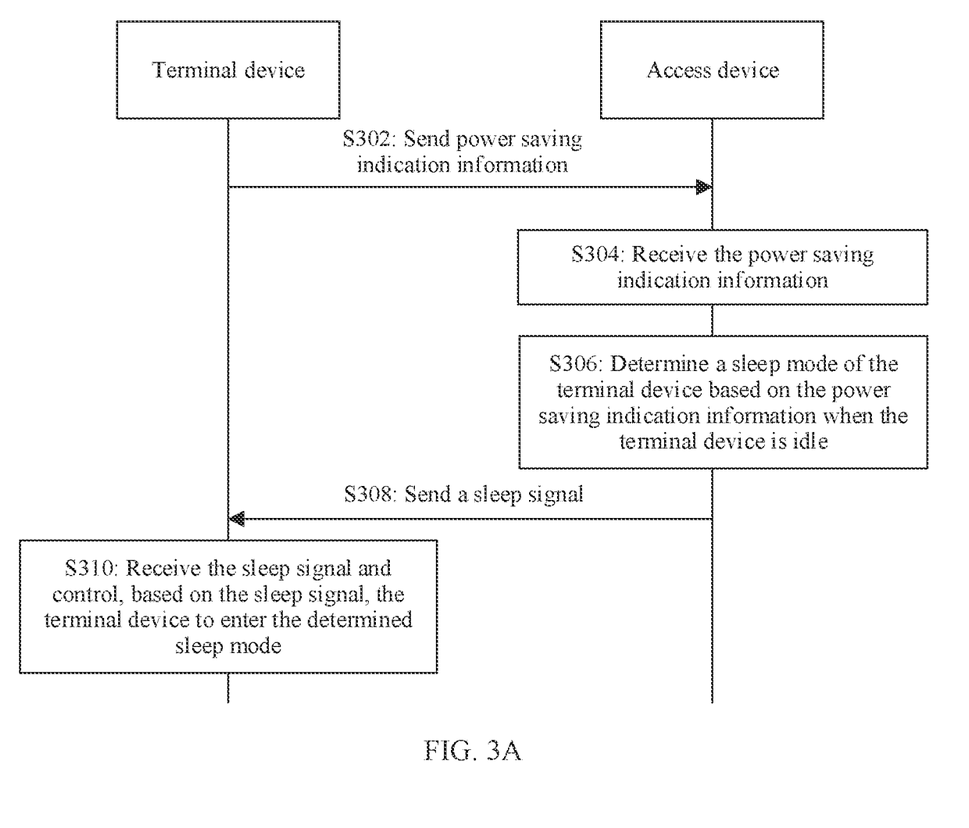
FIG. 3A is a schematic flowchart of a method for reducing terminal power consumption according to an embodiment of this application.

FIG. 3A is a schematic flowchart of a method for reducing terminal power consumption according to an embodiment of this application. The method is implemented based on the communications system 20 shown in FIG. 2. The method may include but is not limited to some or all of the following steps.

S302: A terminal device sends power saving indication information to an access device, where the power saving indication information indicates a power saving capability of the terminal device, and the power saving capability may be specifically a wake-up signal (WUS) supported by the terminal device.

In some embodiments, a wake-up signal (wake-up signal, WUS) includes an in-band WUS and an in-band WUS. The in-band WUS is a WUS sent by a main radio of the access device to a main radio of the terminal device, and the out-of-band WUS is a WUS sent by the main radio of the access device to a WUR of the terminal device.

In some embodiments, a correspondence between the power saving capability of the terminal device and the power saving indication information of the terminal device may be shown in Table 1.

TABLE 1

| Power saving capability | | Power saving |
|---|---|---|
| Out-of-band WUS | In-band WUS | indication information |
| Supported | Supported | 11 |
| Not supported | Supported | 01 |
| Supported | Not supported | 10 |
| Not supported | Not supported | 00 |

It should be understood that the foregoing encoding manner of the power saving indication information is merely an example. When the power saving capability of the terminal device may be classified into more types, 4-bit binary encoding or the like may be further used, which specifically depends on the types of the power saving capability. In addition to Table 1, this application may further include another manner for indicating the power saving capability of the terminal device and the power saving indication information of the terminal device.

The power saving indication information sent by the terminal device to the access device may include but is not limited to the following four implementations.
Implementation 1:

The power saving indication information of the terminal device may be reported to the access device through a radio resource control (Radio Resource Control, RRC) message, for example, an RRC setup request message. The RRC setup request message is a message sent by the terminal device to the access device and used to request to establish a communication connection with the access device in a process of establishing an RRC connection between the terminal device and the access device. It should be understood that when any terminal device accesses an access device, that is, when the terminal device communicates with the access device, an RRC connection is established between the terminal device and the access device. When the terminal device no longer needs to communicate with the access device, the RRC connection is released.
Implementation 2:

The power saving indication information of the terminal device may be sent to the access device through physical layer signaling (also referred to as Layer 1 (Layer 1, L1) signaling), for example, uplink control information (Uplink Control Information, UCI) carried on a physical uplink control channel (Physical Uplink Control Channel, PUCCH). It should be understood that a sending period or a signaling period of the L1 signaling is usually a period of a physical layer frame. Therefore, the L1 signaling is generally used to implement some dynamic control, to transfer frequently-changed information. In embodiments of this application, the L1 signaling is used to transfer the power saving indication information, so that the access device can be notified in a timely manner when the power saving capability of the terminal changes.
Implementation 3:

The power saving indication information of the terminal device may be piggybacked on uplink data carried on a physical uplink shared channel (physical UL shared channel, PUSCH), and sent to the access device.
Implementation 4:

The power saving indication information of the terminal device may be sent to the access device through Layer 2 (Layer 2, L2) signaling, for example, media access control (Media Access Control, MAC) layer signaling (for example, signaling carried in a frame control (Frame Control) field in a frame header of a MAC frame, a MAC control entity (Control Entity, MAC-CE) carried in the field, or the like).

It should be noted that when the power saving indication information of the terminal device is transmitted through the foregoing signaling/message, a data format of the signaling/message changes, and the signaling/message includes a field indicating the power saving indication information.

In addition to the foregoing four implementations, the terminal device may further send the power saving indication information of the terminal device to the access device in another implementation. This is not limited.

S304: The access device receives the power saving indication information.

It should be understood that, after receiving the information/signaling that carries the power saving indication information, the access device may decode the information/signaling to obtain the power saving indication information, so as to determine the power saving capability of the terminal device.

S306: The access device determines a sleep mode of the terminal device based on the power saving indication information when the terminal device is idle.

S308: The access device sends a sleep signal to the terminal device, where the sleep signal indicates the terminal device to enter the sleep mode.

S310: The terminal device receives the sleep signal and controls, based on the sleep signal, the terminal device to enter the determined sleep mode.

In specific implementation, the access device may identify whether the terminal device is in an idle state. For example, when the access device does not receive data sent by a core network device to the terminal device, the access device may consider that the terminal device is in the idle state, and therefore determines a sleep mode of the terminal device based on the power saving indication information. Further, the access device may perform S308.

In another implementation, in addition to the foregoing manner of determining the idle state of the terminal device, the access device may further identify the idle state of the terminal device in another manner. This is not limited in embodiments of this application.

In some embodiments, the access device may determine the sleep mode of the terminal device based on a WUS supported by the access device and the power saving indication information (that is, a WUS supported by the terminal device). Optionally, the sleep mode may include an in-band WUS sleep mode and an out-of-band WUS sleep mode.

For example, if the access device supports an out-of-band WUS, and the terminal device supports an out-of-band WUS, the access device may send a sleep signal indicating the terminal device to enter the out-of-band sleep mode.

After receiving the sleep signal, the terminal device enters the out-of-band sleep mode. To be specific, the terminal device disables a main radio (that is, the terminal device disables a modem and an RF corresponding to the main radio), enables a WUR, and listens to the out-of-band WUS through the WUR, to reduce power consumption of the terminal device. That the access device supports an out-of-band WUS includes two cases: The access device supports an out-of-band WUS and an in-band WUS, and the access device supports an out-of-band WUS but does not support an in-band WUS. That the terminal device supports an out-of-band WUS includes two cases: The terminal device supports an out-of-band WUS and an in-band WUS, and the terminal device supports an out-of-band WUS but does not support an in-band WUS.

For another example, if the access device supports only an in-band WUS or the terminal device supports only an in-band WUS, the access device may send a sleep signal indicating the terminal device to enter the in-band sleep mode. After receiving the sleep signal, the terminal device enters the in-band sleep mode. To be specific, the main radio of the terminal device does not listen on a PDCCH but listens to only the WUS, and the terminal device may disable some RFs and listen to the in-band WUS through the main radio, to reduce power consumption of the terminal device. Optionally, a terminal device including a WUR disables the WUR.

In some embodiments, the access device supports an out-of-band WUS and an out-of-band WUS, power saving indication information corresponds to a sleep mode, and the access device may determine, based on a correspondence between the power saving indication information and the sleep mode, a sleep mode corresponding to power saving indication information of the terminal device.

In some embodiments, the access device supports an out-of-band WUS and an out-of-band WUS, and the access device may alternatively determine a sleep mode of the terminal device based on a service type of the terminal device and power saving indication information of the terminal device. In this way, the access device can control, based on a power saving capability of the terminal device and a service requirement, the terminal device to enter an appropriate sleep mode, to reduce power consumption of the terminal device while ensuring the service requirement.

For example, the access device supports an out-of-band WUS and an out-of-band WUS, and the terminal device also supports an in-band WUS and an out-of-band WUS. The access device may further determine a sleep mode of the terminal device based on a service type of the terminal device. For example, for a service that has a high real-time requirement and/or a service that has a data packet interval less than a preset threshold, the access device may send, to the terminal device, a sleep signal indicating the terminal device to enter the in-band sleep mode, so that the terminal device can quickly resume a data communication connection.

Figure 3B:
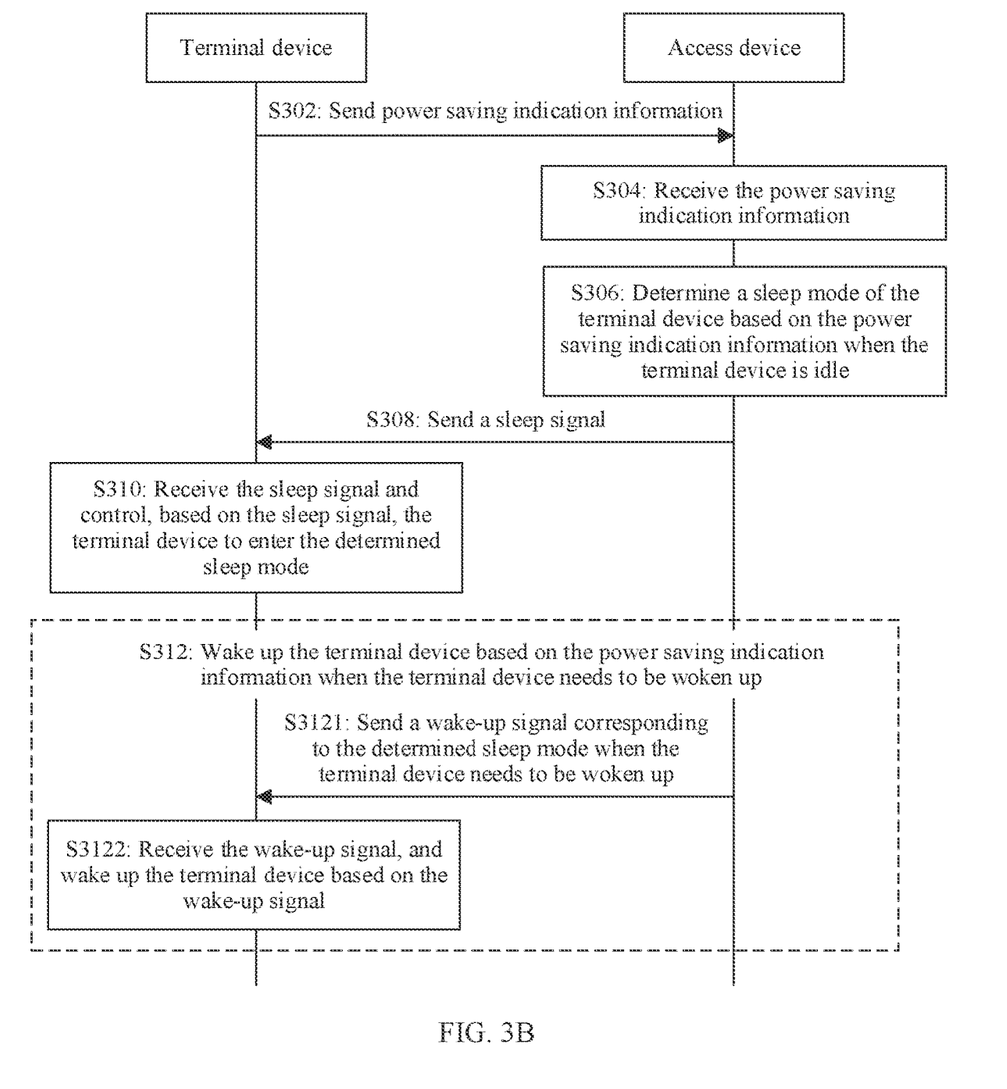
FIG. 3B is a schematic flowchart of another method for reducing terminal power consumption according to an embodiment of this application.

FIG. 3B is a schematic flowchart of another method for reducing terminal power consumption according to an embodiment of this application. In addition to the foregoing S302 to S310, the method may further include the following steps.

S312: An access device wakes up a terminal device based on power saving indication information when the terminal device needs to be woken up.

A specific implementation of S321 may include but is not limited to the following steps.

S3121: The access device sends a wake-up signal corresponding to a determined sleep mode to the terminal device when the terminal device needs to be woken up.

S3122: The terminal device receives the wake-up signal, and wakes up the terminal device based on the wake-up signal.

The access device may identify whether the terminal device needs to be woken up. For example, w % ben the access device receives data sent by a core network device to the terminal device or receives a call request sent by another terminal, the access device may identify that the terminal device needs to be woken up. For another example, when the access device receives data sent by the core network device to the terminal device, and the data belongs to a service that has a high real-time requirement and/or a service that has a data packet interval less than a preset threshold, the access device identifies that the terminal device needs to be woken up. In addition to the foregoing method for determining whether the terminal device needs to be woken up, this application may further include another determining method. Details are not described herein again.

For example, when the terminal device is in an out-of-band sleep mode, the access device sends an out-of-band WUS to a WUR of the terminal device. After detecting the out-of-band WUS through the WUR, the terminal device wakes up a main radio of the terminal device.

For another example, when the terminal device is in an in-band sleep mode, the access device sends an in-band WUS to the terminal device. After detecting the in-band WUS through the main radio, the terminal device wakes up another functional module of the main radio of the terminal device.

In some embodiments, a power saving capability of the terminal device may change, and the terminal device may identify the power saving capability of the terminal device in real time. Before step S302 or before the terminal device is woken up after entering a sleep mode, the method may further include the following step.

S301. After the terminal device identifies a change to the power saving capability of the terminal device, the terminal device sends power saving indication information updated after the change to the access device. The power saving indication information updated after the change indicates a WUS that can be supported by the terminal device after the change to the power saving capability of the terminal device.

When the terminal device detects a WUR sending fault, the power saving capability of the terminal device changes, and the terminal device no longer supports an out-of-band WUS. When a current remaining battery level of the terminal device is less than a preset battery level (for example, 20% or 15%) or the terminal device enters a super power saving mode, the terminal device determines that the power saving capability of the terminal device changes. For example, the terminal device supports only an out-of-band WUS. Generally, when setting that the remaining battery level of the terminal device is less than the preset battery level or that the terminal device enters the super power saving mode, the terminal device may change the power saving capability of the terminal device, so that the access device can control the terminal device to enter a sleep mode of less power consumption. For example, the terminal device changes the power saving capability of the terminal device to support only an out-of-band WUS, so that the access device controls the terminal device to enter the out-of-band sleep mode, to further reduce power consumption of the terminal device.

It should be understood that, after the access device receives the power saving indication information updated after the change, if the terminal device is in a sleep mode, the access device may determine whether a sleep mode corresponding to the power saving indication information updated after the change is consistent with the current sleep mode of terminal device. If the sleep modes are inconsistent, the access device sends, to the terminal device, a sleep signal indicating the terminal device to enter the sleep mode corresponding to the power saving indication information updated after the change, so that the terminal device enters the sleep mode corresponding to the power saving indication information updated after the change to reduce the power consumption of the terminal device.

The following describes an apparatus and a device in embodiments of this application.

Figure 4:
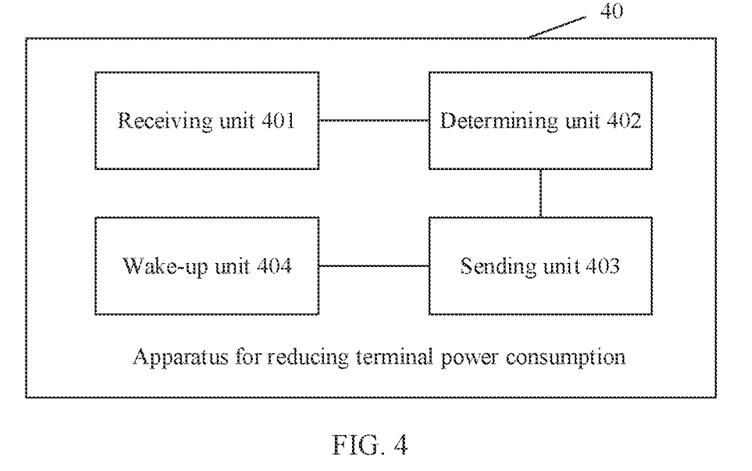
FIG. 4 is a schematic diagram of a structure of an apparatus for reducing terminal power consumption according to an embodiment of this application.

FIG. 4 is a schematic diagram of a structure of an apparatus for reducing terminal power consumption according to an embodiment of this application. The apparatus 40 may be applied to the access device 210 in the communications system 20 shown in FIG. 2, and the apparatus 40 may include some or all of the following units:

a receiving unit 401, configured to receive power saving indication information sent by a terminal device, where the power saving indication information indicates a power saving capability of the terminal device;

a determining unit 402, configured to: when the terminal device is idle, determine a sleep mode of the terminal device based on the power saving indication information; and a sending unit 403, configured to send a sleep signal to the terminal device, where the sleep signal indicates the terminal device to enter the sleep mode.

In a possible implementation, the apparatus 40 further includes:

a wake-up unit 404, configured to: when the terminal device needs to be woken up, wake up the terminal device based on the power saving indication information.

In a possible implementation, the power saving indication information specifically indicates a WUS supported by the terminal device, and the wake-up unit 404 is specifically configured to:

when the power saving indication information indicates that the terminal device supports an out-of-band WUS, send an out-of-band WUS to a wake-up radio (WUR) of the terminal device, where the WUR of the terminal device wakes up a main radio (MR) of the terminal device after receiving the out-of-band WUS; or when the power saving indication information indicates that the terminal device supports an in-band WUS but does not support an out-of-band WUS, send an in-band WUS to a main radio (MR) of the terminal device, where the MR of the terminal device wakes up the main radio of the terminal device after receiving the in-band WUS.

In a possible implementation, the determining unit 402 is specifically configured to:

when the terminal device is idle, determine the sleep mode of the terminal device based on a service type of the terminal device and the power saving indication information.

In a possible implementation, the sleep mode includes an out-of-band sleep mode and an in-band sleep mode. When the terminal device is in the in-band sleep mode, the main radio of the terminal device listens to a wake-up signal; or when the terminal device is in the out-of-band sleep mode, the main radio of the terminal device is disabled, and the WUR of the terminal device is enabled.

In a possible implementation, the receiving unit 401 is specifically configured to:

receive the power saving indication information sent by the terminal device through one of an RRC message, L1 signaling, uplink data piggybacking, or L2 signaling.

For specific implementation of the functional units, refer to related descriptions in the foregoing method embodiments. Details are not described again in this embodiment of this application.

Figure 5A:
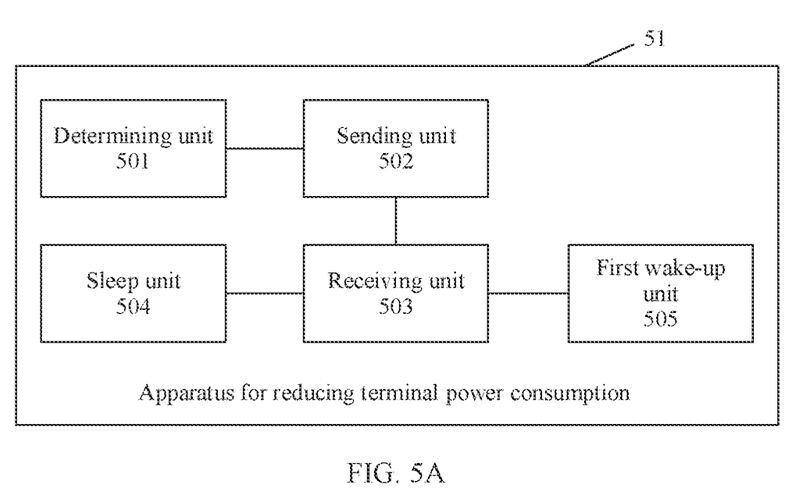
FIG. 5A is a schematic diagram of a structure of another apparatus for reducing terminal power consumption according to an embodiment of this application.
Figure 5B:
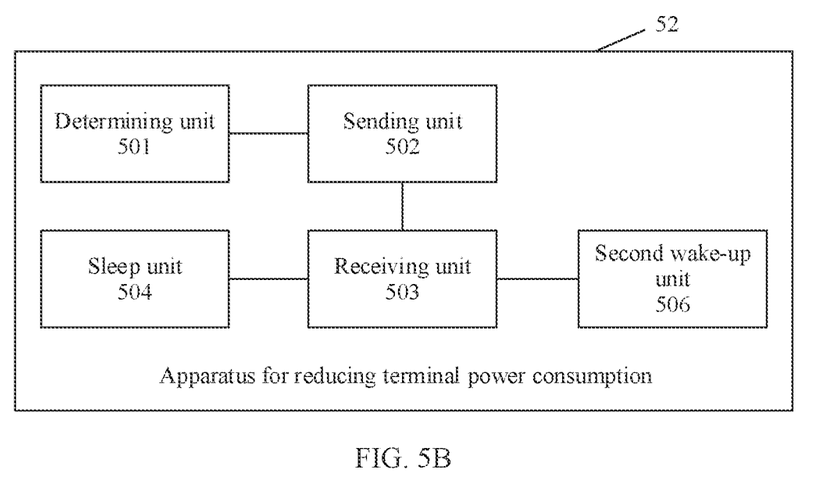
FIG. 5B is a schematic diagram of a structure of still another apparatus for reducing terminal power consumption according to an embodiment of this application.

FIG. 5A and FIG. 5B are each a schematic diagram of a structure of apparatus for reducing terminal power consumption according to an embodiment of this application. The apparatus 51 and the apparatus 52 may be respectively applied to the terminal device 220 or the terminal device 230 in the communications system 20 shown in FIG. 2. The apparatus 51 or the apparatus 52 may include some or all of the following units:

a determining unit 501, configured to determine power saving indication information based on a wake-up signal supported by the terminal device, where the power saving indication information indicates a power saving capability of the terminal device;

a sending unit 502, configured to send the power saving indication information to an access device, so that when the terminal device is idle, the access device determines a sleep mode of the terminal device based on the power saving indication information and sends a sleep signal to the terminal device;

a receiving unit 503, configured to receive the sleep signal; and a sleep unit 504, configured to: after the receiving unit 503 receives the sleep signal, control, based on the sleep signal, the terminal device to enter the sleep mode.

In the apparatus 51 shown in FIG. 5A, the power saving indication information specifically indicates a WUS supported by the terminal device, and the apparatus 51 further includes:

a first wake-up unit 505, configured to: after a wake-up radio (WUR) of the terminal device receives an out-of-band WUS sent by the access device, wake up the terminal device based on the out-of-band WUS, where the out-of-band WUS is sent by the access device to the WUR of the terminal device when the power saving indication information indicates that the terminal device supports an out-of-band WUS.

In the apparatus 52 shown in FIG. 5B, the power saving indication information specifically indicates a WUS supported by the terminal device, and the apparatus 52 further includes:

a second wake-up unit 506, configured to: after a main radio (MR) of the terminal device receives an in-band WUS sent by the access device, wake up the terminal device based on the in-band WUS, where the in-band WUS is sent by the access device to the WUR of the terminal device when the power saving indication information indicates that the terminal device supports an in-band WUS but does not support an out-of-band WUS.

In a possible implementation, the sleep mode is determined by the access device based on a service type of the terminal device and the power saving indication information when the terminal device is idle.

In a possible implementation, the sleep mode includes an out-of-band sleep mode and an in-band sleep mode. When the terminal device is in the in-band sleep mode, the main radio of the terminal device listens to a wake-up signal; or when the terminal device is in the out-of-band sleep mode, the main radio of the terminal device is disabled, and the WUR of the terminal device is enabled.

In a possible implementation, the sending unit 503 is further configured to:

when detecting a change to the power saving capability of the terminal device, send power saving indication information updated after the change to the access device, where the power saving indication information updated after the change indicates a changed power saving capability of the terminal device.

In a possible implementation, the sending unit 503 is specifically configured to:

send the power saving indication information to the access device through one of an RRC message, L1 signaling, uplink data piggybacking, or L2 signaling.

For specific implementation of the functional units, refer to related descriptions in the foregoing method embodiments. Details are not described again in this embodiment of this application.

Figure 6:
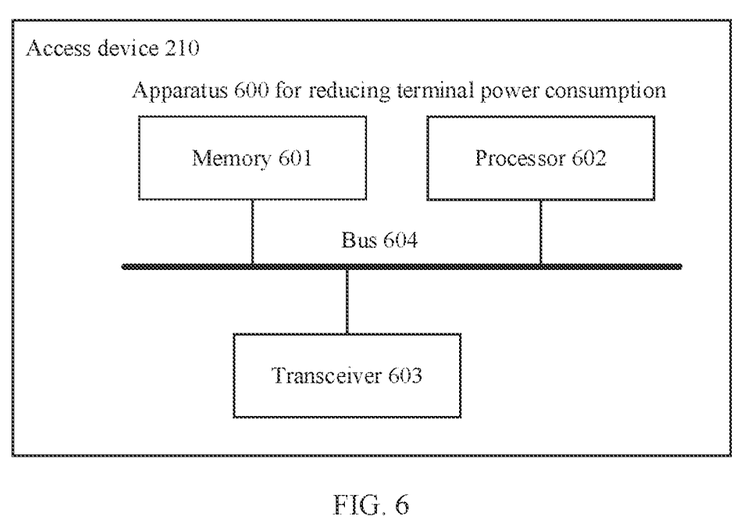
FIG. 6 is a schematic diagram of a structure of yet another apparatus for reducing terminal power consumption according to an embodiment of this application.

FIG. 6 is a schematic diagram of a hardware structure of another apparatus for reducing terminal power consumption according to an embodiment of the present invention. An apparatus 600 for reducing terminal power consumption shown in FIG. 6 (the apparatus 600 may be specifically a computer device) includes one or more memories 601, one or more processors 602, a transceiver 603, and a bus 604. The one or more memories 601, the one or more processors 602, and the transceiver 603 implement communication connection with each other through the bus 604.

The memory 601 may be a read only memory (Read Only Memory, ROM), a static storage device, a dynamic storage device, or a random access memory (Random Access Memory, RAM). The memory 601 may store a program. When the program stored in the memory 601 is executed by the processor 602, the processor 602 and the transceiver 603 are configured to perform the steps of the neural network compression in embodiment 3 and embodiment 4 of this application.

The processor 602 may be a general-purpose central processing unit (Central Processing Unit, CPU), a microprocessor, an application specific integrated circuit (Application Specific Integrated Circuit, ASIC), a graphics processing unit (graphics processing unit, GPU), or one or more integrated circuits, and is configured to execute a related program, to implement functions that need to be performed by the units in the neural network compression apparatus in embodiments of this application, or perform the neural network compression method in method embodiments of this application.

The processor 602 may be an integrated circuit chip and has a signal processing capability. In an implementation process, the steps of the neural network compression method in this application may be completed by using a hardware integrated logic circuit in the processor 602 or instructions in a form of software. The processor 602 may be a general-purpose processor, a digital signal processor (Digital Signal Processor, DSP), an application-specific integrated circuit (ASIC), a field programmable gate array (Field Programmable Gate Array, FPGA) or another programmable logic device, a discrete gate or transistor logic device, or a discrete hardware component. The processor 602 can implement or perform the method for reducing terminal power consumption disclosed in embodiments of this application and steps performed by the access device in the logical block diagrams. The general-purpose processor may be a microprocessor, or the processor may be any conventional processor or the like. The steps of the method disclosed with reference to embodiments of this application may be presented as being performed and completed by a hardware decoding processor, or performed and completed by a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory 601, and the processor 602 reads information in the memory 601, and completes, in combination with hardware of the processor 602, a function that needs to be performed by the unit included in the apparatus 400 for reducing terminal power consumption in embodiments of this application, or performs steps performed by the access device in method embodiments of this application.

The transceiver 603 is configured to implement communication with a terminal device, a core network device, or another device to exchange data. For example, the transceiver 603 may receive, obtain, or send data, for example, receive power saving indication information sent by the terminal device, and send a sleep signal or a wake-up signal to the terminal device.

The bus 604 may include a channel through which information is transmitted between the parts (for example, the memory 601, the processor 602, and the transceiver 603) of the apparatus 600.

It should be understood that the receiving unit 401 and the sending unit 402 in the apparatus 400 for reducing terminal power consumption may be equivalent to the transceiver 603 in the apparatus 40 for reducing terminal power consumption and the determining unit 402 in the apparatus 40 may be equivalent to the processor 602.

For specific implementation of the functional units, refer to related descriptions in the foregoing method embodiments. Details are not described again in this embodiment of this application.

Figure 7:
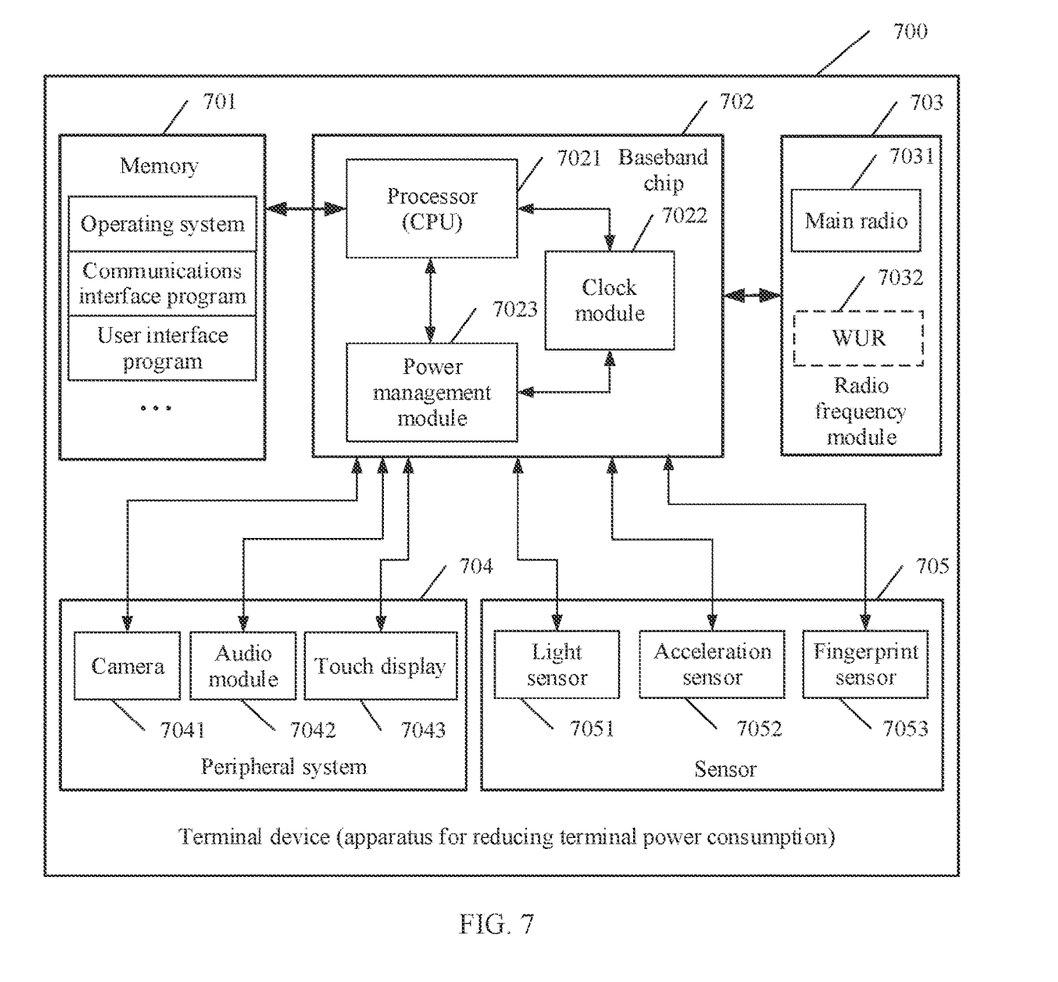
FIG. 7 is a schematic diagram of a structure of still yet another apparatus for reducing terminal power consumption according to an embodiment of this application.

FIG. 7 is a schematic block diagram of still another apparatus for reducing terminal power consumption according to an embodiment of this application. An apparatus 700 (the apparatus 700 may be specifically a terminal device) for reducing terminal power consumption shown in FIG. 7 includes one or more memories 701, a baseband chip 702, a radio frequency module 703, and a peripheral system 704 and a sensor 705. The baseband chip 702 includes one or more processors 7021, for example, a CPU, a clock module 7022, and a power management module 7023. The peripheral system 704 includes a camera 7041, an audio module 7042, a touch display 7043, and the like. Further, the sensor 705 may include a light sensor 7051, an acceleration sensor 7052, a fingerprint sensor 7053, and the like. The modules included in the peripheral system 704 and the sensor 705 may be increased or decreased as required. Any two connected modules may be specifically connected through a bus. The bus may be an industry standard architecture (English: industry standard architecture, ISA for short) bus, a peripheral component interconnect (English: peripheral component interconnect, PCI for short) bus, an extended industry standard architecture (English: extended industry standard architecture, EISA for short) bus, or the like.

The radio frequency module 703 may include an antenna and a main radio 7031 (including a modem). The main radio 7031 is configured to convert an electromagnetic wave received by the antenna into a current and finally into a digital signal. Correspondingly, the main radio 7031 is further configured to convert a digital signal to be output by the mobile phone into a current, and then into an electromagnetic wave, and finally transmit the electromagnetic wave into free space through the antenna. The radio frequency module 703 may further include at least one amplifier configured to amplify a signal. Generally, the radio frequency module 703 may be used for wireless transmission, for example, Bluetooth (English: Bluetooth) transmission, wireless-fidelity (English: Wireless-Fidelity, Wi-Fi for short) transmission, third generation mobile communications technology (English: 3rd-Generation, 3G for short) transmission, and fourth generation mobile communications technology (English: the 4th Generation mobile communications, 4G for short) transmission.

In some apparatuses 700, radio frequency modules 703 may further include WURs 7032 (including modems), configured to receive out-of-band WUSs or sleep signals, and may be further configured to send power saving indication information, or the like. The WUR 7032 is configured to convert an electromagnetic wave received by an antenna into a current and finally into a digital signal. Correspondingly, the WUR 7032 is further configured to convert a digital signal to be output by the mobile phone into a current and then into an electromagnetic wave, and finally transmit the electromagnetic wave into free space through the antenna. It should be understood that the main radio 7031 and the WUR 7032 may share an antenna, or may share a part of an antenna, or may share no antenna. This is not limited.

To reduce power consumption of the apparatus 700, when the apparatus 700 is idle, the main radio 7031 may be disabled and the WUR 7032 may be enabled. The apparatus 700 listens to an out-of-band WUS sent by an access device through the WUR 7032. After the apparatus 700 receives the out-of-band WUS, the WUR 7032 may wake up the main radio 7031, so that the main radio 7031 enters a normal working state.

In another apparatus 700, a radio frequency module 703 may include only a main radio 7031. In this case, w % ben the apparatus 700 is idle, the apparatus 700 controls the main radio 7031 to enter a normal sleep mode. In this case, the main radio 7031 may listen to only an in-band WUS. After the apparatus 700 receives the in-band WUS, the main radio 7031 wakes up the main radio 7031 to enter a normal working state.

The touch display 7043 may be configured to display information entered by a user or display information for the user. The touch display 7043 may include a touch panel and a display panel. Optionally, the display panel may be configured in a form of a liquid crystal display (English: Liquid Crystal Display, LCD for short), an organic light-emitting diode (English: Organic Light-Emitting Diode, OLED for short), or the like. Further, the touch panel may cover the display panel. When detecting a touch operation on or near the touch panel, the touch panel transmits the touch operation to the processor 7021 to determine an event type of the touch operation. Then, the processor 7021 provides a corresponding visual output on the display panel based on the event type of the touch operation. The touch panel and the display panel are used as two independent components to implement input and output functions of the terminal 700. However, in some embodiments, the touch panel and the display panel may be integrated to implement the input and output functions of the terminal 700.

The camera 7041 is configured to acquire an image. The audio input module 7042 may be specifically a microphone, and may obtain a voice.

The sensor 705 may include the light sensor 7051, the acceleration sensor 7052, and the fingerprint sensor 7052. The light sensor 7051 is configured to obtain light intensity of an environment. The acceleration sensor 7052 (such as a gyroscope) may obtain a motion status of the terminal 700. The fingerprint sensor 7053 may obtain input fingerprint information. After sensing a related signal, the sensor 705 quantizes the signal to a digital signal, and transfers the digital signal to the processor 7021 for further processing.

The memory 701 may be a high-speed RAM memory, or may be anon-volatile memory (non-volatile memory), for example, at least one magnetic disk memory. Optionally, the memory 701 may further include at least one storage apparatus far away from the processor 7021. The memory 701 may specifically include an instruction storage area and a data storage area. The instruction storage area may store a program such as an operating system, a user interface program, or a communications interface program. The data storage area may store data required by the processor to perform a related operation or data generated by performing a related operation.

As a control center of the terminal 700, the processor 7021 connects all parts of the entire mobile phone through various interfaces and lines, and runs the program stored in the memory 701 and invokes the data stored in the memory 701 to perform various functions of the terminal 700. Optionally, the processor 7021 may include one or more application processors. The application processor mainly processes the operating system, a user interface, an application program, and the like. In this embodiment of this application, the processor 7021 reads information in the memory 701, and completes, in combination with hardware of the processor 7021, a function that needs to be performed by the unit included in the apparatus 51 for reducing terminal power consumption or the apparatus 52 for reducing terminal power consumption in embodiments of this application, or performs the method for reducing terminal power consumption in method embodiments of this application.

The user implements a communication function of the terminal 700 by using the radio frequency module 703. Specifically, the terminal 700 may receive a sleep signal and/or a wake-up signal sent by the access device 210, and the apparatus 40 for reducing terminal power consumption, and send power saving indication information, other data, or the like to the access device 210 and the apparatus 40 for reducing terminal power consumption.

It should be noted that for specific implementations and beneficial effects of the foregoing operations, refer to corresponding descriptions of the embodiment shown in FIG. 3A or FIG. 3B and possible embodiments thereof.

For specific implementation of the functional units, refer to related descriptions in the embodiments shown in FIG. 3A and FIG. 3B. Details are not described again in this embodiment of this application.

It should be noted that although only the memory, the processor, and the transceiver of each of the apparatus 600 and the apparatus 700 shown in FIG. 6 and FIG. 7 are illustrated, in a specific implementation process, a person skilled in the art should understand that the apparatus 400 and the apparatus 700 each further include other components necessary for normal running. In addition, according to a specific requirement, the person skilled in the art should understand that the apparatus 600 and the apparatus 700 may further include hardware components for implementing other additional functions. In addition, the person skilled in the art should understand that the apparatus 600 and the apparatus 700 each may alternatively include only components required for implementing embodiments of this application, but not necessarily include all the components shown in FIG. 6 or FIG. 7.

It may be understood that the apparatus 600 is equivalent to the access device 170 in FIG. 2, and the apparatus 700 is equivalent to the terminal device 220 or the terminal device 230 in FIG. 2. A person of ordinary skill in the art may be aware that, with reference to the units and algorithm steps described in the examples of embodiments disclosed in this specification, embodiments of this application may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

The person skilled in the art can understand that the functions described with reference to various illustrative logical blocks, modules, and algorithm steps disclosed and described in this specification can be implemented by hardware, software, firmware, or any combination thereof. If software is used for implementation, the functions described with reference to the illustrative logical blocks, modules, and steps may be stored in or transmitted over a computer-readable medium as one or more instructions or code and executed by a hardware-based processing unit. The computer-readable medium may include a computer-readable storage medium. The computer-readable storage medium corresponds to a tangible medium such as a data storage medium, or a communications medium including any medium that facilitates transfer of a computer program from one place to another place (for example, according to a communications protocol). In this manner, the computer-readable medium may generally correspond to; (1) a non-transitory tangible computer-readable storage medium, or (2) a communication medium, for example, a signal or a carrier. The data storage medium may be any available medium that can be accessed by one or more computers or one or more processors to retrieve instructions, code, and/or data structures for implementing the technologies described in this application. A computer program product may include a computer-readable medium.

By way of example and not limitation, the computer-readable storage medium may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or a data structure and can be accessed by a computer. In addition, any connection is appropriately referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium may not include a connection, a carrier, a signal, or another transitory medium, but actually mean a non-transitory tangible storage medium. Disks and optical discs used in this specification include a compact disc (CD), a laser disc, an optical disc, a digital versatile disc (DVD), and a Blu-ray disc. The disks generally magnetically reproduce data, whereas the optical discs optically reproduce data with lasers. Combinations of the foregoing objects should also be included in the scope of the computer-readable medium.

The foregoing descriptions are merely examples of specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by an access device, wherein the method comprises:
   receiving, from a terminal device, power saving indication information indicating a power saving capability of the terminal device;
   determining, based on the power saving indication information, a sleep mode of the terminal device when the terminal device is idle, wherein the sleep mode comprises an out-of-band sleep mode and an in-band sleep mode, wherein a main radio (MR) of the terminal device is disabled and a wake-up radio (WUR) of the terminal device is enabled when the terminal device is in the out-of-band sleep mode, wherein the MR listens to a wake-up signal (WUS) when the terminal device is in the in-band sleep mode, and wherein the terminal device is idle when the access device does not receive data from a core network device to the terminal device; and
   sending, to the terminal device, a sleep signal instructing the terminal device to enter the sleep mode.

2. The method of claim 1, further comprising waking up, based on the power saving indication information, the terminal device when the terminal device needs to be woken up.

3. The method of claim 2, wherein the power saving indication information further indicates the WUS supported by the terminal device, and wherein waking up the terminal device comprises:
   sending an out-of-band WUS to the WUR when the power saving indication information indicates that the terminal device supports the out-of-band WUS, wherein the WUR is configured to wake up the MR based on the out-of-band WUS; and
   sending an in-band WUS to the MR when the power saving indication information indicates that the terminal device supports the in-band WUS but does not support the out-of-band WUS, wherein the MR is configured to wake up based on the in-band WUS.

4. The method of claim 1, wherein the sleep mode is based on a service type of the terminal device and the power saving indication information.

5. The method of claim 1, wherein receiving the power saving indication information comprises receiving the power saving indication information through one of a Radio Resource Control (RRC) message, layer 1 (L1) signaling, uplink data piggybacking, or layer 2 (L2) signaling.

6. A method implemented by a terminal device, wherein the method comprises:

determining, based on a wake-up signal supported by the terminal device, power saving indication information indicating a power saving capability of the terminal device;

sending the power savingindication information to an access devicefor determining a sleep mode of the terminal device when the terminal device is idle, wherein the sleep mode comprises an out-of-band sleep mode and an in-band sleep mode, wherein a main radio (MR) of the terminal device is disabled and a wake-up radio (WUR) of the terminal device is enabled when the terminal device is in the out-of-band sleep mode, wherein the MR listens to a wake-up signal (WUS) when the terminal device is in the in-band sleep mode, and wherein the terminal device is idle when the access device does not receive data from a core network device to the terminal device;

receiving a sleep signal from the access device when the terminal device is idle; and controlling, based on the sleep signal, the terminal device to enter the sleep mode.

7. The method of claim 6, wherein the power saving indication information indicates the WUS supported by the terminal device, and wherein the method further comprises:
receiving, by the WUR, an out-of-band WUS from the access device when the power saving indication information indicates that the terminal device supports the out-of-band WUS; and
waking up the MR based on the out-of-band WUS.

8. The method of claim 6, wherein the power saving indication information indicates the WUS supported by the terminal device, and wherein the method further comprises:
receiving, by the MR, an in-band WUS from the access device when the power saving indication information indicates that the terminal device supports the in-band WUS but does not support an out-of-band WUS; and
waking up the MR based on the in-band WUS.

9. The method of claim 6, wherein the sleep mode is based on a service type of the terminal device and the power saving indication information when the terminal device is idle.

10. The method of claim 6, further comprising sending updated power saving indication information to the access device when the terminal device detects a change to the power saving capability.

11. The method of claim 6, wherein sending the power saving indication information comprises sending the power saving indication information through one of a Radio Resource Control (RRC) message, layer 1 (L1) signaling, uplink data piggybacking, or layer 2 (L2) signaling.

12. A terminal device comprising
a main radio (MR) configured to exchange data with an access device; and
a processor coupled to the MR and configured to:
determine power saving indication information based on a wake-up signal supported by the terminal device, wherein the power saving indication information indicates a power saving capability of the terminal device;
send the power saving indication information to the access device that determines a sleep mode of the terminal device when the terminal device is idle, wherein the sleep mode comprises an out-of-band sleep mode and an in-band sleep mode, wherein a main radio (MR) of the terminal device is disabled and a wake-up radio (WUR) of the terminal device is enabled when the terminal device is in the out-of-band sleep mode, wherein the MR listens to a wake-up signal (WUS) when the terminal device is in the in-band sleep mode, and wherein the terminal device is idle when the access device does not receive data from a core network device to the terminal device;
receive a sleep signal from the access device when the terminal device is idle; and
control, based on the sleep signal, the terminal device to enter the sleep mode.

13. The terminal device of claim 12, wherein the power savingindication information further indicates the WUS supported by the terminal device, and wherein the processor is further configured to:
receive, by the WUR, an out-of-band WUS from the access device when the power saving indication information indicates that the terminal device supports the out-of-band WUS; and
wake up the MR based on the out-of-band WUS.

14. The terminal device of claim 12, wherein the power savingindication information further indicates the WUS supported by the terminal device, and wherein the processor is further configured to:
receive, by the MR, an in-band WUS from the access device when the power saving indication information indicates that the terminal device supports the in-band WUS but does not support an out-of-band WUS; and
wake up the MR based on the in-band WUS.

15. The terminal device of claim 12, wherein the sleep mode is based on a service type of the terminal device and the power saving indication information when the terminal device is idle.

16. The terminal device of claim 12, wherein the processor is further configured to send updated power saving indication information to the access device when the terminal device detects a change to the power saving capability.

17. The terminal device of claim 12, wherein the processor is further configured to send the power saving indication information through one of a Radio Resource Control (RRC) message, layer 1 (L1) signaling, uplink data piggybacking, or layer 2 (L2) signaling.

* * * * *